W. Adamson
Glue,

Nº 65,785.  Patented June 18, 1867.

Witnesses
Wm. Albert Steel
John Parker

Inventor
W Adamson
By his attorney
H. Howson

United States Patent Office.

WILLIAM ADAMSON, OF PHILADELPHIA, PENNSYLVANIA.

Letters Patent No. 65,785, dated June 18, 1867.

IMPROVED GLUE.

The Schedule referred to in these Letters Patent and making part of the same.

TO ALL WHOM IT MAY CONCERN:

Be it known that I, WILLIAM ADAMSON, of Philadelphia, Pennsylvania, have invented an improved Glue; and I do hereby declare the following to be a full, clear, and exact description of the same.

My invention consists of size, aerated substantially in the manner described hereafter, so as to form a tenacious, easily-melted, and economical glue, to take the place of the ordinary glue, the manufacture of which, as usually practised, involves the necessity of resorting to the tedious, precarious, and expensive process of drying, as hereinafter more fully explained.

Before I proceed to describe the manner of manufacturing my improved glue, it will be well to refer in the outset to the process of making glue, as ordinarily practised.

Glue is made from raw hides, the sinews of animals, and bones, which are first prepared in a solution of caustic alkali, then dried and boiled in water, the product or size being allowed to flow into boxes or moulds, and the size, when cool and in the condition of jelly, being cut into slices and placed on netting to be converted into merchantable glue by exposure to the air. The size itself cannot be used as a cement or glue, owing to its want of tenacity; but during the process of drying it undergoes a change which renders it available as a cement when melted in the usual manner. The drying of glue is a tedious and precarious process, slight changes of the atmosphere having more or less injurious effect on the slices of size.

My improved glue is produced without the usual desiccating or drying process, in a manner which I will now proceed to describe, reference being had to the accompanying drawing, which forms a part of this specification, and in which—

Figure 1:
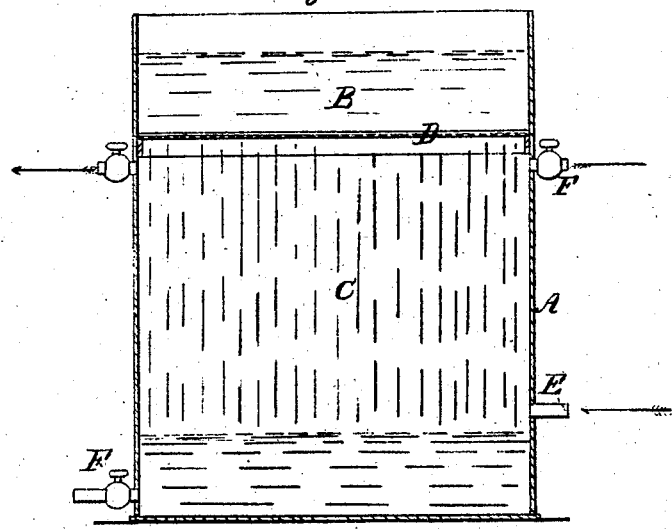
Figure 2:
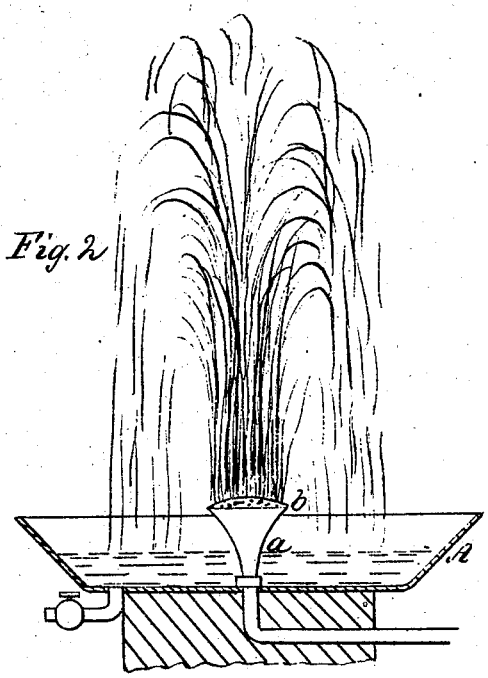

Figure 1 represents a vertical section of apparatus by which my aerated glue may be made; and Figure 2, a view of another apparatus for the same purpose In fig. 1, A is a vessel or tank, open at the top, and divided into two compartments, B and C, by a perforated partition, D. Near the bottom of the vessel is a pipe, E, communicating with the lower compartment C, and with a force-pump or other suitable apparatus for discharging volumes of compressed air, and immediately beneath the partition any desired number of faucets, F, are secured to the vessel, for a purpose described hereafter. The hot size, fresh from the kettles for boiling the same, is poured into the upper compartment B, and on to the perforated partition, through which it rains down into the lower compartment, meeting in its passage an upward current of air, forced through the pipe E, the air passing through the faucets F, after being brought into intimate contact with the streams of size. The size which has thus fallen into the lower compartment, and has been brought into intimate contact with the air, may be withdrawn from time to time through the pipe G, and may, if necessary, be subjected to one or more repetitions of this process. The intimate contact of a plentiful and forcible supply of air with the subdivided streams of size has the same effect of converting the latter into a tenacious cement as the more tedious and precarious process of desiccating or drying above alluded to.

This aerating process can be practised at all seasons of the year, and during all kinds of weather; hence, a great saving of time and labor is effected; at the same time the result or product is a most tenacious glue, which is of a pasty consistency, and which can be made ready for immediate use by simply diluting and warming it, instead of waiting, as usual, until the ordinary dry glue can be dissolved. The aerating process may be accomplished by simply forcing jets of air through a mass of the size, although I prefer the mode of causing the size to fall in finely-subdivided streams, which meet a volume of compressed air. Should it be desirable to reduce the quantity of water in the size, I use heated air for taking up the moisture.

Another mode of producing aerated glue is illustrated in fig. 2, where A represents a tank, in the centre of which is a tubular projection, a, with a flaring end covered with a perforated plate or wire gauze, b, and forming what is technically termed a rose. The hot size is forced through this rose, above which it is projected in a number of minute jets upwards through the air, to fall into the reservoir below, from whence it may be drawn to be again forced through the rose, should it be necessary. In some instances carbonic acid, carburetted hydrogen, or other gas or mixture of gases, may be used in place of air, with good results.

Without confining myself to any specific mode or process of producing my improved glue, I claim as my invention, and desire to secure by Letters Patent, as a new article of manufacture and commerce—

A glue consisting of size aerated or treated with gas, substantially in the manner described.

In testimony whereof I have signed my name to this specification in the presence of two subscribing witnesses.

WM. ADAMSON.

Witnesses:
  JOHN WHITE,
  W. J. R. DELANY.